United States Patent
Hagiwara

(10) Patent No.: US 11,495,788 B2
(45) Date of Patent: Nov. 8, 2022

(54) METHOD FOR PRODUCING SLURRY, METHOD FOR PRODUCING ACTIVE MATERIAL LAYER, AND METHOD FOR PRODUCING ALL SOLID STATE BATTERY

(71) Applicant: TOYOTA JIDOSHA KABUSHIKI KAISHA, Toyota (JP)

(72) Inventor: Hideki Hagiwara, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 119 days.

(21) Appl. No.: 16/838,125

(22) Filed: Apr. 2, 2020

(65) Prior Publication Data

US 2020/0335772 A1 Oct. 22, 2020

(30) Foreign Application Priority Data

Apr. 16, 2019 (JP) .............................. JP2019-077712

(51) Int. Cl.
- *H01M 4/36* (2006.01)
- *H01M 4/04* (2006.01)
- *H01M 10/0562* (2010.01)
- *H01M 4/62* (2006.01)
- *H01M 4/485* (2010.01)

(52) U.S. Cl.
CPC ......... *H01M 4/362* (2013.01); *H01M 4/0402* (2013.01); *H01M 4/485* (2013.01); *H01M 4/62* (2013.01); *H01M 10/0562* (2013.01); *H01M 2300/0068* (2013.01)

(58) Field of Classification Search
CPC .... H01M 4/362; H01M 4/0402; H01M 4/485; H01M 4/62; H01M 10/0562; H01M 2300/0068; H01M 4/1391; H01M 4/131; H01M 4/628; H01M 10/052; H01M 10/058; H01M 2004/021; Y02E 60/10; Y02P 70/50

See application file for complete search history.

(56) References Cited

U.S. PATENT DOCUMENTS

2012/0263993 A1* 10/2012 Hosoe ................... H01M 4/661
 429/131
2016/0260963 A1 9/2016 Suzuki

FOREIGN PATENT DOCUMENTS

| JP | 2012099315 A | 5/2012 |
| JP | 2012238545 A | 12/2012 |
| JP | 2016-162733 A | 9/2016 |

* cited by examiner

*Primary Examiner* — Andrew J. Oyer
(74) *Attorney, Agent, or Firm* — Dickinson Wright, PLLC

(57) ABSTRACT

A main object of the present disclosure is to provide a method for producing a slurry in which chronological aggregation of an oxide active material is restrained. The present disclosure achieves the object by providing a method for producing a slurry containing an oxide active material, a solid electrolyte, a dispersion medium, and at least one of a conductive material and a binder, the method comprising: a dispersion preparing step of preparing a dispersion containing the oxide active material, the solid electrolyte, and the dispersion medium; and an adding step of adding at least one of the conductive material and the binder to the dispersion; wherein when Hansen parameters ($\sigma H$) of the oxide active material, the solid electrolyte, and the dispersion medium are respectively regarded as $\sigma Ha$, $\sigma Hb$, and $\sigma Hc$, relationship of $\sigma Ha - \sigma Hc \geq 5$, and relationship of $\sigma Ha > \sigma Hb > \sigma Hc$ are satisfied.

14 Claims, 2 Drawing Sheets

METHOD FOR PRODUCING SLURRY, METHOD FOR PRODUCING ACTIVE MATERIAL LAYER, AND METHOD FOR PRODUCING ALL SOLID STATE BATTERY

TECHNICAL FIELD

The present disclosure relates to a method for producing slurry in which chronological aggregation of an oxide active material is restrained.

BACKGROUND ART

An all solid state battery is a battery including a solid electrolyte layer between a cathode active material layer and an anode active material layer, and one of the advantages thereof is that the simplification of the safety device therefor can be more easily intended compared to a liquid-based battery that includes an electrolyte containing a flammable organic solvent.

For example, Patent Literature 1 discloses a method for producing an all solid state battery using an active material slurry produced by mixing an active material with a solvent and then mixing a solid electrolyte, a conductive material, and a binder therewith. Also, although it is not a slurry, Patent Literature 2 discloses a method for producing an all solid state battery using a cathode material produced by mixing a powder active material, a solid electrolyte, and a binder.

CITATION LIST

Patent Literatures

Patent Literature 1: Japanese Patent Application Laid-Open (JP-A) No. 2012-238545
Patent Literature 2: JP-A No. 2012-099315

SUMMARY OF DISCLOSURE

Technical Problem

In order to form an active material layer for a battery, a slurry containing the constituent of the active material layer may be used in some cases. In slurry, chronological aggregation of an oxide active material easily occurs when the compatibility of the oxide active material with a dispersion medium is low. The present disclosure has been made in view of the above circumstances, and the main object thereof is to provide a method for producing a slurry in which chronological aggregation of an oxide active material is restrained.

Solution to Problem

In order to achieve the object, the present disclosure provides a method for producing a slurry containing an oxide active material, a solid electrolyte, a dispersion medium, and at least one of a conductive material and a binder, the method comprising: a dispersion preparing step of preparing a dispersion containing the oxide active material, the solid electrolyte, and the dispersion medium; and an adding step of adding at least one of the conductive material and the binder to the dispersion; wherein when Hansen parameters ($\sigma H$) of the oxide active material, the solid electrolyte, and the dispersion medium are respectively regarded as $\sigma Ha$, $\sigma Hb$, and $\sigma Hc$, relationship of $\sigma Ha-\sigma Hc \geq 5$, and relationship of $\sigma Ha > \sigma Hb > \sigma Hc$ are satisfied.

According to the present disclosure, a slurry in which chronological aggregation of an oxide active material is restrained may be obtained throughout two steps: preparing a dispersion containing an oxide active material, a solid electrolyte, and a dispersion medium; and then adding at least one of a conductive material and a binder thereto, with the specific relation of Hansen parameters ($\sigma H$) of the oxide active material, the solid electrolyte, and the dispersion medium.

In the disclosure, relationship of $\sigma Ha-\sigma Hc \geq 7$ may be satisfied.

In the disclosure, when an average of the $\sigma Ha$ and the $\sigma Hc$ is regarded as $(\sigma Ha+\sigma Hc)/2$, an absolute value of the difference between the $(\sigma Ha+\sigma Hc)/2$ and the $\sigma Hb$ may be 3 or less.

In the disclosure, the difference between the $\sigma Hb$ and the $\sigma Hc$ may be 5 or more and 8 or less.

In the disclosure, the dispersion preparing step may comprise: a first dispersing treatment of dispersing the oxide active material to the dispersion medium so as to obtain a precursor dispersion; and a second dispersing treatment of dispersing the solid electrolyte to the precursor dispersion so as to obtain the dispersion.

In the disclosure, the oxide active material may contain a Li element, a Ti element, and an O element.

In the disclosure, the solid electrolyte may be a sulfide solid electrolyte.

In the disclosure, the dispersion medium may be at least one kind of a butyl butylate, a diisobutyl ketone, and a xylene.

In the disclosure, when a viscosity measurement is conducted using a rheometer, a viscosity of the slurry at shearing speed of 1 $S^{-1}$ is regarded as $V_1$, and a viscosity of the slurry at shearing speed of 1000 $S^{-1}$ is regarded as $V_{1000}$, a rate $V_1/V_{1000}$, which is a rate of the $V_1$ to the $V_{1000}$ may be 22.7 or less.

The present disclosure also provides a method for producing an active material layer used in an all solid state battery, the method comprising: a slurry preparing step of preparing the slurry by the above described method for producing the slurry; and an active material layer forming step of forming the active material layer using the slurry.

According to the present disclosure, the above described slurry is used, and thus an active material layer in which occurrence of coating defect of slurry is inhibited may be obtained.

The present disclosure also provides a method for producing an ail solid state battery including a cathode active material layer, an anode active material layer, and a solid electrolyte layer formed between the cathode active material layer and the anode active material layer, the method comprising: a slurry preparing step of preparing the slurry by the above described method for producing the slurry; and an active material layer forming step of forming the cathode active material layer or the anode active material layer, using the slurry.

According to the present disclosure, the above described slurry is used, and thus an all solid state battery including an active material layer in which occurrence of coating defect of slurry is inhibited may be obtained.

Advantageous Effects of Disclosure

The present disclosure exhibits an effect such that a slurry in which chronological aggregation of an oxide active material is restrained can be produced.

DESCRIPTION OF EMBODIMENTS

A. Method for Producing Slurry

Figure 1:
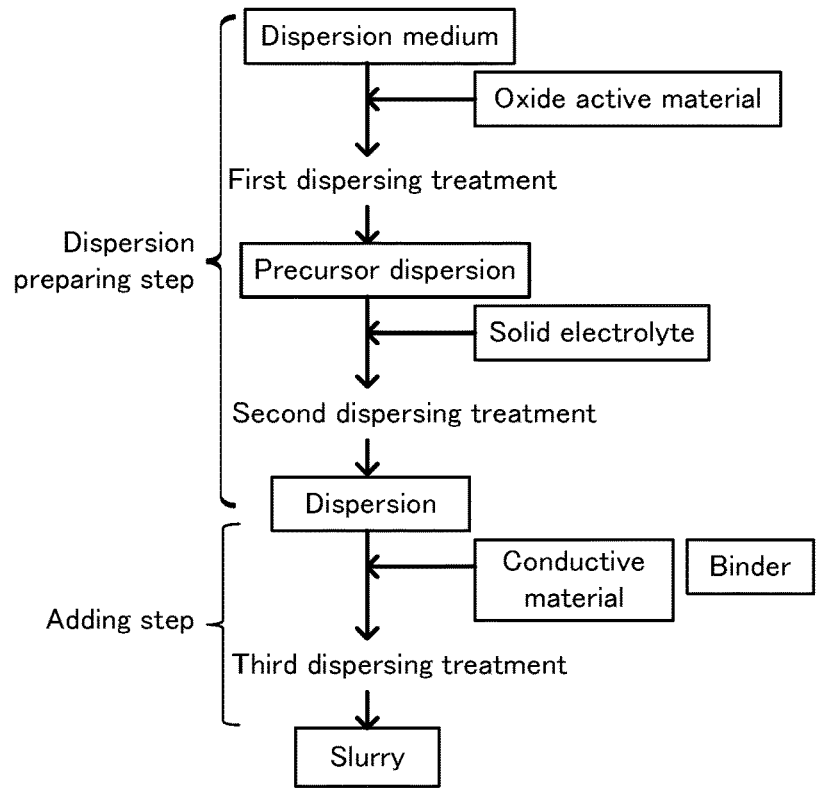
FIG. 1 is a flow chart showing an example of the method for producing the slurry in the present disclosure.

FIG. 1 is a flow chart showing an example of the method for producing the slurry the present disclosure. In the method for producing the slurry in the present disclosure, first, a dispersion containing an oxide active material, a solid electrolyte, and a dispersion medium is prepared. There are no particular limitations on the method for preparing the dispersion; however, in FIG. 1, a precursor dispersion is obtained by adding the oxide active material to the dispersion medium to conduct a first dispersing treatment. After that, a dispersion is obtained by adding the solid electrolyte to the precursor dispersion to conduct a second dispersing treatment. Next, in FIG. 1, a slurry is obtained by adding a conductive material and a binder to the obtained dispersion to conduct a third dispersing treatment. In this manner, in the present disclosure, one of the features is to go through two steps: preparing the dispersion containing the oxide active material, the solid electrolyte, and the dispersion medium; and then adding at least one of the conductive material and the binder thereto. Further, another feature of the present disclosure is the Hansen parameters ($\sigma H$) of the oxide active material, the solid electrolyte, and the dispersion medium are in specific relation.

According to the present disclosure, a slurry which chronological aggregation of an oxide active material is restrained may be obtained throughout two steps preparing a dispersion containing an oxide active material, a solid electrolyte, and a dispersion medium; and then adding at least one of a conductive material and a binder thereto, with the specific relation of Hansen parameters ($\sigma H$) of the oxide active material, the solid electrolyte, and the dispersion medium.

As described above, in order to form an active material layer for a battery, a slurry containing the constituent of the active material layer may be used in some cases. When an aggregate (particularly aggregate of 100 μm or more) is included in a slurry, coating defect may occur in some cases. For example, when the slurry is subjected to die-coating, coating defect such as generation of stripe (non-coated part) easily occurs when the tip of die is clogged up with the aggregate. Also, even when the tip of die is not clogged up with the aggregate, when the aggregate is deposited on the surface of the active material layer to be obtained, a crack is easily generated in a solid electrolyte layer arranged so as to face the active material layer. Also, even when the aggregate is not included right after the production of slurry, the above problem may be easily caused when chronological aggregation occurs until using the slurry for the coating. Also, the slurry may be, even after it is installed into a coating device, placed still in a distribution tube or a manifold until coating is conducted. In such a case also, the occurrence of the chronological aggregation is not preferable.

The inventor of the present application studied thoroughly about the cause of the chronological aggregation, and found out that the oxide active material greatly affected thereto. Further, he has obtained a knowledge that the chronological aggregation of the oxide active material easily occurred when the compatibility of the oxide active material with the dispersion medium was low. It is presumed that the chronological aggregation of the oxide active material is promoted when the compatibility of the oxide active material with the dispersion medium is low, since the dispersion medium works to remove the oxide active material in the slurry. Then, a solid electrolyte having high compatibility with both the oxide active material and with the dispersion medium has been used; as a result, the chronological aggregation of the oxide active material has been restrained. In the present disclosure, as an index of the compatibility, Hansen parameter ($\sigma H$) has been focused.

Also, as described in Comparative Examples later, there may be some cases the slurry is produced by adding the solid electrolyte, the conductive material, and the binder at the same time to the dispersion of the oxide active material. It has been found out that the addition of the solid electrolyte, the conductive material, and the binder at the same time is advantageous such that the production time may be shortened, although the conductive material and the binder can be the cause of promoting the chronological aggregation of the oxide active material. Then, in the present disclosure, it has been found out that the chronological aggregation of the oxide active material may be restrained throughout the two steps: preparing the dispersion containing the oxide active material, the solid electrolyte, and the dispersion medium; and then adding at least one of the conductive material and the binder thereto.

In this manner, according to the present disclosure, a slurry in which chronological aggregation of an oxide active material is restrained may be obtained throughout two steps: preparing a dispersion containing an oxide active material, a solid electrolyte, and a dispersion medium; and then adding at least one of a conductive material and a binder thereto, with the specific relation of Hansen parameters ($\sigma H$) of the oxide active material, the solid electrolyte, and the dispersion medium.

1. Dispersion Preparing Step

The dispersion preparing step in the present disclosure is a step of preparing a dispersion containing an oxide active material, a solid electrolyte, and a dispersion medium. Also, when Hansen parameters ($\sigma H$) of the oxide active material, the solid electrolyte, and the dispersion medium are respectively regarded as $\sigma Ha$, $\sigma Hb$, and $\sigma Hc$, relationship of $\sigma Ha - \sigma Hc \geq 5$, and relationship of $\sigma Ha > \sigma Hb > \sigma Hc$ are satisfied. Hansen parameters ($\sigma H$) may be obtained from, for example, Hansen Solubility Parameters: A user's handbook, Second. Edition. Boca. Raton, Fla.: CRC Press. (Hansen, Charles (2007)). Incidentally, the unit of solubility is $MPa^{0.5}$.

In the present disclosure, the difference between $\sigma Ha$ and $\sigma Hc$ is large. It means that, in the present disclosure, the compatibility of the oxide active material with the dispersion medium is low. The difference between $\sigma Ha$ and $\sigma Hc$, ($\sigma Ha - \sigma Hc$) is, usually 5 or more, may be 7 or more, and may be 9 or more. Meanwhile, the difference between $\sigma Ha$ and $\sigma Hc$, ($\sigma Ha - \sigma Hc$) is, for example, 20 or less, and may be 15 or less.

In the present disclosure, $\sigma Hb$ is lower than $\sigma Ha$ and higher than $\sigma Hc$. Thus, the solid electrolyte is highly compatible with the oxide active material, and thereby, for example, easily adsorbed to the surface of the oxide active material. At the same time, the solid electrolyte is also highly compatible with the dispersion medium and thus the removal from the dispersion medium (aggregation) does not easily occur. Here, the average of σHa and σHc is determined as (σHa+σHc)/2. Meanwhile, the difference between σHa and σHc is determined as (σHa−σHc), σHb may be in the range of (σHa+σHc)/2±0.3 (σHa−σHc), may be in the range of (σHa+σHc)/2±0.2 (σHa−σHc), and may be in the range of (σHa+σHc)/2±0.1 (σHa−σHc).

Also, (σHa+σHc)/2 may be the same value as that of σHb, may be larger than σHb, and may be smaller than σHb. The absolute value of the difference between (σHa+σHc)/2 and σHb is, for example, 5 or less, may be 3 or less, and may be 2.6 or less.

The difference between σHa and σHb (σHa−σHb) is, for example, 1 or more, and may be 2 or more. Meanwhile, σHa−vHb is, for example, 10 or less, and may be 5 or less. Also, the difference between σHb and σHc (σHb−σHc) is, for example, 3 or more, and may be 5 or more. Meanwhile, σHb−σHc is, for example, 15 or less, and may be 8 or less.

σHa is, for example, 8 or more and may be 10 or more. Meanwhile, σHa is, for example, 25 or less. Also, σHb is, for example, 5 or more, and may be 8 or more. Meanwhile, σHb is, for example, 18 or less. Also, σHc is, for example, 1 or more, and may be 2 or more. Meanwhile, σHc is, for example, 10 or less, and may be 8 or less.

(1) Oxide Active Material

The oxide active material in the present disclosure is an active material containing at least an O element. The oxide active material preferably contains a Li element, a transition metal element, and an O element. Examples of the transition metal element may include at least one kind of a Ti element, a Co element, a Mn element, a Ni element, a V element, and an Fe element. Also, examples of the crystal structure of the oxide active material may include a spinel type structure and a rock salt bed type structure.

It is preferable that the oxide active material contains a Li element, a Ti element, and an O element. Further, it is preferable that this oxide active material includes a spinel type structure. Examples of such an oxide active material may include $Li_4Ti_5O_{12}$.

Examples of the shape of the oxide active material may include a granular shape. The average particle size ($D_{50}$) of the oxide active material is, for example, 0.05 μm or more and may be 0.1 μm or more. Meanwhile, the average particle size ($D_{50}$) of the oxide active material is, for example, 20 μm or less and may be 10 μm or less. Incidentally, the average particle size ($D_{50}$) of the oxide active material may be obtained from, for example, the observation with a SEM (scanning electron microscope). The number of samples is preferably many; for example, it is 20 or more, may be 50 or more, and may be 100 or more.

The proportion of the oxide active material in the solid component of the slurry is, for example, 30 weight % or more and 70 weight % or less.

(2) Solid Electrolyte

The solid electrolyte in the present disclosure has ion conductivity. Examples of the solid electrolyte may include an inorganic solid electrolyte such as a sulfide solid electrolyte, an oxide solid electrolyte, a nitride solid electrolyte, and a halide solid electrolyte.

Examples of the sulfide solid electrolyte may include a solid electrolyte containing a Li element, an X element (X is at least one kind of P, Si, Ge, Sn, B, Al, Ga, and In), and a S element. Also, the sulfide solid electrolyte may further contain at least one kind of an O element and a halogen element. Examples of the sulfide solid electrolyte may include $Li_2S$—$P_2S_5$, $Li_2S$—$P_2S_5$—$Li_3PO_4$, $LiI$—$P_2S_5$—$Li_3PO_4$, $Li_2S$—$P_2S_3$—$LiI$, $Li_2S$—$P_2S_5$—$LiI$—$LiBr$, $Li_2S$—$P_2S_5$—$Li_2O$, $Li_2S$—$P_2S_5$—$Li_2O$—$LiI$, $Li_2S$—$P_2O_5$, $LiI$—$Li_2S$—$P_2O_5$, $Li_2S$—$SiS_2$, $Li_2S$—$SiS_2$—$LiI$, $Li_2S$—$SiS_2$—$LiI$—$LiBr$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (provided that m and n is a positive number; Z is one of Ge, Zn, and Ga), $Li_2S$—$GeS_2$, $Li_2S$—$SiS_2$—$Li_3PO_4$, and $Li_2S$—$SiS_2$—$Li_xMO_y$ (provided that x and y is a positive number; M is one of P, Si, Ge, B, Al, Ga, and In).

Also, examples of the oxide solid electrolyte may include a solid electrolyte containing a Li element, a Y element (Y is at least one kind of Nb, B, Al, Si, P, Ti, Zr, Mo, W, and S), and an O element. Also, examples of the nitride solid electrolyte may include $Li_3N$, and examples of the halide solid electrolyte may include LiCl, LiI, and LiBr.

The average particle size ($D_{50}$) of the solid electrolyte is, for example, 0.05 μm or more, and may be 0.1 μm or more. Meanwhile, the average particle size ($D_{50}$) of the solid electrolyte is, for example, 20 μm or less, and may be 10 μm or less.

The proportion of the solid electrolyte in the solid component of the slurry is, for example, 1 weight % or more and 50 weight % or less.

(3) Dispersion Medium

The dispersion medium in the present disclosure gives fluidity to the slurry. Also, the dispersion medium may dissolve a part of the constituent of the slurry. Examples of the dispersion medium may include ester such as butyl butyrate, dibutyl ether, and ethyl acetate; ketone such as diisobutyl ketone (DIBK), methyl ketone, and methyl propyl ketone; an aromatic hydrocarbon such as xylene, benzene, and toluene; alkane such as heptane, dimethyl butane, and methyl hexane; and amine such as tributyl amine and aryl amine.

The proportion of the dispersion medium in the slurry when the solid component of the slurry is determined as 100 parts by weight is, for example, 60 parts by weight or more, and may be 70 parts by weight or more. Meanwhile, the proportion of the dispersion medium in the slurry when the solid component of the slurry is determined as 100 parts by weight is, for example, 120 parts by weight or less, and may be 110 parts by weight or less.

(4) Method for Fabricating Dispersion

There are no particular limitations on the method for fabricating the dispersion in the present disclosure. Examples of the method may include, as shown in FIG. 1, a fabrication method comprising steps of: adding the oxide active material to the dispersion medium and conducting the first dispersing treatment to obtain a precursor dispersion; and adding the solid electrolyte to the precursor dispersion and conducting the second dispersing treatment to obtain the dispersion. On the other hand, although not illustrated, an additional example of the method for fabricating the dispersion may include a fabrication method comprising steps of: adding the solid electrolyte to the dispersion medium and conducting the first dispersing treatment to obtain the precursor dispersion; adding the oxide active material to the precursor dispersion and conducting the second dispersing treatment to obtain the dispersion. Also, further additional example of the fabrication method may include a fabrication method comprising a step of adding both the oxide active material and the solid electrolyte to the dispersion medium and conducting a dispersing treatment to obtain the dispersion.

As the dispersing treatment, a known arbitrary method may be adopted, and examples thereof may include a method using an ultrasonic homogenizer. Dispersing treatment time is, for example, 15 minutes or more and 90 minutes or less.

2. Adding Step

The adding step in the present disclosure is a step of adding at least one of the conductive material and the binder to the dispersion. In the case of adding both of the conductive material and the binder, the conductive material and the binder may be added at the same time, the conductive material may be added first and then the binder may be added thereafter, and the binder may be added first and then the conductive material may be added thereafter.

Examples of the conductive material may include a carbon material. Examples of the carbon material may include a particle shape carbon material such as acetylene black (AB) and Ketjen black (KB), a fiber shape carbon material such as carbon fiber, carbon nanotube (CNT), carbon nanofiber (CNF), and vapor growth carbon fiber (VGCF). The proportion of the conductive material in the solid component of the slurry is, for example, 1 weight % or more and 20 weight %, or less.

Examples of the binder may include a fluorine-based binder such as polyvinylidene fluoride (PVdF) and a rubber-based binder such as butylene rubber (BR) and styrene butadiene rubber (SBR). The proportion of the binder in the solid component of the slurry is, for example, 1 weight % or more and 10 weight % or less.

In the present disclosure, the slurry may be obtained by adding at least one of the conductive material and the binder to the dispersion medium, and then conducting a dispersing treatment thereto. The method of dispersing treatment is in the same contents as those described above; thus, the description herein is omitted. Dispersing treatment time is, for example, 15 minutes or more and 90 minutes or less.

3. Slurry

The slurry in the present disclosure preferably has a low viscosity at low shearing speed. Viscosity measurement is conducted using a rheometer, a viscosity of the slurry at shearing speed of 1 $S^{-1}$ is regarded as $V_1$, and a viscosity of the slurry at shearing speed of 1000 $S^{-1}$ is regarded as $V_{1000}$. A rate $V_1/V_{1000}$, which is a rate of the $V_1$ to the $V_{1000}$ is, for example, 25 or less, may be 23 or less, and may be 21 or less. Meanwhile, $V_1/V_{1000}$ is, for example, 5 or more.

B. Method for Producing Active Material Layer

The method for producing the active material layer in the present disclosure is a method for producing an active material layer used in an all solid state battery, the method comprising: a slurry preparing step of preparing the slurry by the above described method for producing the slurry; and an active material layer forming step of forming the active material layer using the slurry.

According to the present disclosure, the above described slurry is used, and thus an active material layer in which occurrence of coating defect of slurry is inhibited may be obtained.

The slurry preparing step is in the same contents as those described in "A. Method for producing slurry"; thus, the description herein is omitted.

The active material layer forming step is a step of forming the active material layer using the slurry. Examples of the method for forming the active material layer may include a method of pasting the slurry and drying thereof. The slurry is preferably pasted on a current collector. There are no particular limitations on the method for pasting the slurry, and a known arbitrary pasting method may be adopted.

C. Method for Producing All Solid State Battery

The method for producing the all solid state battery in the present disclosure is a method for producing an all solid state battery including a cathode active material layer, an anode active material layer, and a solid electrolyte layer formed between the cathode active material layer and the anode active material layer, the method comprising: a slurry preparing step of preparing the slurry by the above described method for producing the slurry; and an active material layer forming step of forming the cathode active material layer or the anode active material layer, using the slurry.

According to the present disclosure, the above described slurry is used, and thus an all solid state battery including an active material layer in which occurrence of coating defect of slurry is inhibited may be obtained.

The slurry preparing step is in the same contents as those described in "A. Method for producing slurry"; thus, the description herein is omitted. Also, the active material forming step is in the same contents as those described in "B. Method for producing active material layer"; thus, the description herein is omitted. In the present disclosure, the above described slurry preparing step and active material layer forming step may be conducted for forming the cathode active material layer, may be conducted for forming the anode active material layer, and may be conducted for forming both the cathode active material layer and the anode active material layer. Incidentally, there are no particular limitations on the method for forming the solid electrolyte layer, and a known arbitrary forming method may be adopted.

Figure 2:
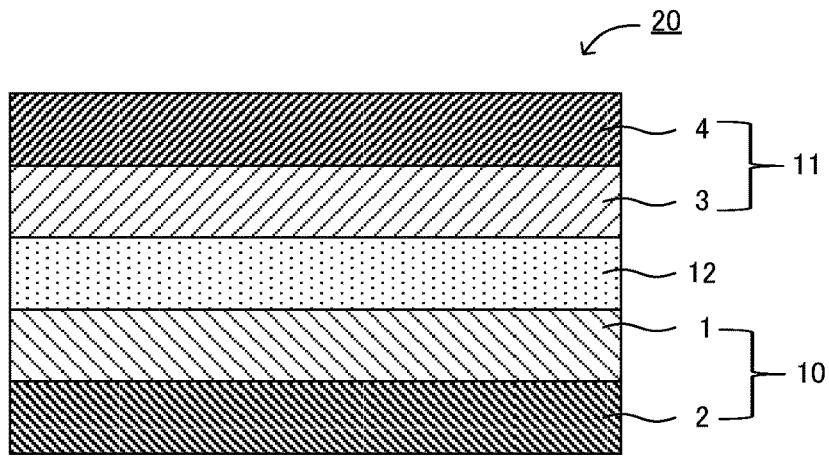
FIG. 2 is a schematic cross-sectional view showing an example of an all solid state battery in the present disclosure.

FIG. 2 is a schematic cross-sectional view illustrating an example of the all solid state battery in the present disclosure. All solid state battery 20 comprises cathode 11 including cathode active material layer 3 and cathode current collector 4, anode 10 including anode active material layer 1 and anode current collector 2 and solid electrolyte layer 12 formed between the cathode active material layer 3 and the anode active material layer 1.

The all solid state battery is preferably an all solid lithium battery. Also, the all solid state battery may be a primary battery and may be a secondary battery, but the secondary battery is preferable among them. The reason therefor is that it may be repeatedly charged and discharged and useful as a car-mounted battery, for example. Also, the all solid state battery in the present disclosure may be a single cell, and may be a layered cell. The layered cell may be a monopolar type layered cell (layered cell connected in parallel) and may be a bipolar type layered cell (layered cell connected in series). Examples of the shape of the all solid state battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

Lithium titanate of 78.5 parts by weight as an oxide active material ($Li_4Ti_5O_{12}$ (LTO), average particle diameter of 0.8

μm, primary particle), sulfide solid electrolyte of 1.9 parts by weight as a solid electrolyte ($Li_2S$—$P_2S_5$ series, average particle diameter of 0.5 μm, primary particle), VGCF (ϕ=0.15 μm) of 16.3 parts by weight as a conductive material, and PVdF of 3.3 parts by weight as a binder were prepared. Meanwhile, butyl butyrate of 90 parts by weight was prepared as a dispersion medium.

As shown in FIG. 1, LTO was added to the butyl butyrate, the first dispersing treatment (60 minutes) using an ultrasonic homogenizer was conducted thereto, and thereby a precursor dispersion was obtained. The sulfide solid electrolyte was added to the obtained precursor dispersion, the second dispersing treatment (60 minutes) using an ultrasonic homogenizer was conducted thereto, and thereby a dispersion was obtained. The VGCF and the PVdF were added at the same time to the obtained dispersion, the third dispersing treatment (30 minutes) using an ultrasonic homogenizer was conducted thereto, and thereby a slurry was produced.

Examples 2 to 3

A slurry was respectively produced in the same manner as in Example 1, except that the dispersion medium, the active material, the solid electrolyte, the conductive material, and the binder as shown in Table 1 were respectively used.

Comparative Example 1

Figure 3:
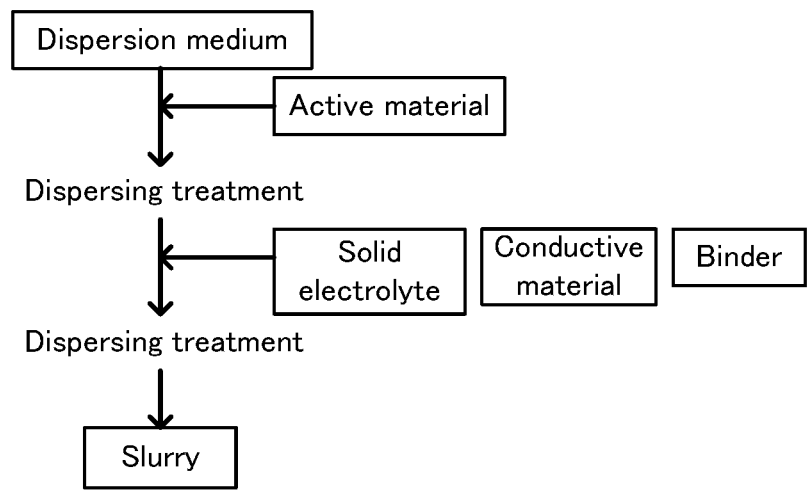
FIG. 3 is a flow chart showing an example of the method for producing the slurry in Comparative Examples 1 to 5.

A slurry was produced using the production method shown in FIG. 3. First, each material was prepared in the same manner as in Example 1, LTO was added to the butyl butyrate, and the dispersing treatment using an ultrasonic homogenizer (60 minutes) was conducted thereto. Next, the sulfide solid electrolyte, the VGCF, and the PVdF were added thereto at the same time, the dispersing treatment using an ultrasonic homogenizer (60 minutes) was conducted thereto, and thereby a slurry was produced.

Comparative Examples 2 to 5

A slurry was respectively produced in the same manner as in Comparative Example 1, except that the dispersion medium, the active material, the solid electrolyte, the conductive material, and the binder as shown in Table 2 were respectively used.

Evaluation

<Aggregation Properties>

The maximum particle size of the aggregate in each slurry obtained in Examples 1 to 3 and Comparative Examples 1 to 5 right after the production (0 h) was respectively measured. In the same manner, the maximum particle size of the aggregates after placing thereof still at a room temperature (25° C.) for 24 hours was respectively measured. For the measurement of the particle size, a fineness gage (grind meter) was used. The results are shown in Tables 1 and 2.

<Viscosity Properties>

Each slurry obtained in Examples 1 to 3 and Comparative Examples 1 to 5 was placed still at a room temperature (25° C.) for 24 hours. Regarding the each slurry after placed still, viscosity $V_1$ at shearing speed of 1 $S^{-1}$ and viscosity $V_{1000}$ at shearing speed of 1000 $S^{-1}$ were measured using a rheometer, and the value of $V_1/V_{1000}$ was respectively calculated. The results are shown in Tables 1 and 2.

TABLE 1

|  |  | Example 1 | Example 2 | Example 3 |
| --- | --- | --- | --- | --- |
| Active material | Material | LTO | LTO | LTO |
|  | σ Ha | 13.4 | 13.4 | 13.4 |
| Solid electrolyte | Material | $Li_2S$—$P_2S_5$ | $Li_2S$—$P_2S_5$ | $Li_2S$—$P_2S_5$ |
|  | σ Hb | 10.8 | 10.8 | 10.8 |
| Conductive material | Material | VGCF | VGCF | VGCF |
| Binder | Material | PVdF | PVdF | PVdF |
| Dispersion medium | Material | Butyl butyrate | DIBK | Xylene |
|  | σ Hc | 5.6 | 4.1 | 3.1 |
| Method for producing slurry |  | FIG. 1 | FIG. 1 | FIG. 1 |
| σ Ha − σ Hc |  | 7.8 | 9.3 | 10.3 |
| σ Hb − σ Hc |  | 5.2 | 6.7 | 7.7 |
| Maximum particle size [μm] fineness gage (0 h) |  | 30 | 30 | 30 |
| Maximum particle size [μm] fineness gage (24 h) |  | 40 | 40 | 30 |
| Viscosity $V_1$ at 1 $S^{-1}$ [mPa · s] |  | 34000 | 32000 | 29000 |
| Viscosity $V_{1000}$ at 1000 $S^{-1}$ [mPa · s] |  | 1500 | 1500 | 1400 |
| $V_1/V_{1000}$ |  | 22.7 | 21.3 | 20.7 |

TABLE 2

|  |  | Comp. Example 1 | Comp. Example 2 | Comp. Example 3 | Comp. Example 4 | Comp. Example 5 |
| --- | --- | --- | --- | --- | --- | --- |
| Active material | Material | LTO | LTO | LTO | LTO | Carbon |
|  | σ Ha | 13.4 | 13.4 | 13.4 | 13.4 | 12.5 |
| Solid electrolyte | Material | $Li_2S$—$P_2S_5$ | $Li_2S$—$P_2S_5$ | $Li_2S$—$P_2S_5$ | $Li_2S$—$P_2S_5$ | $Li_2S$—$P_2S_5$ |
|  | σ Hb | 10.8 | 10.8 | 10.8 | 10.8 | 10.8 |
| Conductive material | Material | VGCF | VGCF | VGCF | VGCF | VGCF |
| Binder | Material | PVdF | PVdF | PVdF | PVdF | PVdF |
| Dispersion medium | Material | Butyl butyrate | DIBK | Xylene | 1.6hexanediol | Butyl butyrate |
|  | σ Hc | 5.6 | 4.1 | 3.1 | 8.7 | 5.6 |
| Method for producing slurry |  | FIG. 3 | FIG. 3 | FIG. 3 | FIG. 3 | FIG. 3 |
| σ Ha − σ Hc |  | 7.8 | 9.3 | 10.3 | 4.7 | 6.9 |
| σ Hb − σ Hc |  | 5.2 | 6.7 | 7.7 | 2.1 | 5.2 |
| Maximum particle size [μm] fineness gage (0 h) |  | 40 | 40 | 30 | 40 | 40 |
| Maximum particle size [μm] fineness gage (24 h) |  | 100 | 90 | 100 | 50 | 50 |
| Viscosity $V_1$ at 1 $S^{-1}$ [mPa · s] |  | 75000 | 68000 | 81000 | 36000 | 29000 |

TABLE 2-continued

|  | Comp. Example 1 | Comp. Example 2 | Comp. Example 3 | Comp. Example 4 | Comp. Example 5 |
|---|---|---|---|---|---|
| Viscosity $V_{1000}$ at 1000 $S^{-1}$ [mPa · s] | 1500 | 1300 | 1700 | 1600 | 1300 |
| $V_1/V_{1000}$ | 50.0 | 52.3 | 47.6 | 22.5 | 22.3 |

As shown in Table 1, in Examples 1 to 3, there was no large difference between the maximum particle size of the aggregates right after the production and the maximum particle size of the aggregates after placed still; thus, it was confirmed that the chronological aggregation of the particles was restrained. In consideration of the composition of each of the slurry, it is highly possible that the chronological aggregation of the oxide active material was restrained. On the other hand, in Comparative Examples 1 to 3, the maximum particle size of the aggregates after placed still was more than twice the maximum particle size of the aggregates right after the production; thus, it was confirmed that the oxide active material was chronologically aggregated. In this manner, in comparison of Examples 1 to 3 with Comparative Examples 1 to 3, it was confirmed that the difference in timing of adding the conductive material and the binder greatly affected the chronological generation of aggregates.

Also, when the viscosity properties of Examples 1 to 3 were compared to those of Comparative Examples 1 to 3, it was confirmed that the viscosity $V_1$ at the low shearing speed of 1 $S^{-1}$ in Examples 1 to 3 was respectively low. Since the viscosity at the low shearing speed is greatly affected by the active material (LTO) which was the main component of the slurry, it was suggested that the surface state of the active material was changed in Examples 1 to 3. In specific, it was presumed that the solid electrolyte was adsorbed to the active material on a priority basis, and thus the viscosity at the low shearing speed was degraded. Incidentally, the viscosity $V_{1000}$ at the high shearing speed of 1000 $S^{-1}$ is greatly affected by the solid component of the slurry but almost not at all affected by the dispersion state; thus, it was presumed that the values in Examples 1 to 3 and in Comparative Examples 1 to 3 were similar.

Also, in Comparative Example 4, there was no large difference between the maximum particle size of the aggregate right after the production and the maximum particle size of the aggregate after placed still. This was presumably because the difference between σHa and σHc was small. In specific, since the compatibility of the active material with the dispersion medium was comparatively high, it was presumed that the aggregation of the active material itself did not occur. Accordingly, it was suggested that the aggregation of the active material was a phenomenon that occurs when the compatibility of the active material with the dispersion medium used in the slurry was low. Also in Comparative Example 5, there was no large difference between the maximum particle size of the aggregate right after the production and the maximum particle size of the aggregate after placed still. Accordingly, it was suggested that the aggregation of the active material was a phenomenon peculiar to the case when an oxide active material was used. The reason why the aggregation easily occurs upon the usage of oxide active material is presumably because the solubility parameter σHa of the oxide active material tends to increase and that easily results in relatively enlarging the difference between the σHa and the solubility parameter σHc of the dispersion medium (σHa−σHc).

REFERENCE SINGS LIST 1 anode active material layer
2 anode current collector
3 cathode active material layer
4 cathode current collector
10 anode
11 cathode
12 solid electrolyte layer
20 all solid state battery

What is claimed is:

1. A method for producing a slurry containing an oxide active material, a solid electrolyte, a dispersion medium, and at least one of a conductive material and a binder, the method comprising:
   a dispersion preparing step of preparing a dispersion containing the oxide active material, the solid electrolyte, and the dispersion medium; and
   an adding step of adding at least one of the conductive material and the binder to the dispersion and then conducting a dispersing treatment thereto; wherein
   when Hansen parameters (σH) of the oxide active material, the solid electrolyte, and the dispersion medium are respectively regarded as σHa, σHb, and σHc, relationship of σHa−σHc≥5, and relationship of σHa>σHb>σHc are satisfied, and
   the oxide active material contains a Li element, a transition element, and an O element,
   the solid electrolyte contains a Li element, an X element, wherein X is at least one kind of P, Si, Ge, Sn, B, Al, Ga, and In, and a S element, and
   the dispersion medium is at least one of an ester, a ketone, an aromatic hydrocarbon, alkane and amine.

2. The method for producing the slurry according to claim 1, wherein relationship of σHa−σHc≥7 is satisfied.

3. The method for producing the slurry according to claim 1, wherein when an average of the σHa and the σHc is regarded as (σHa+σHc)/2, an absolute value of the difference between the (σHa+σHc)/2 and the σHb is 3 or less.

4. The method for producing the slurry according to claim 1, wherein the difference between the σHb and the σHc is 5 or more and 8 or less.

5. The method for producing the slurry according to claim 1, wherein
   the dispersion preparing step comprises:
   a first dispersing treatment of dispersing the oxide active material to the dispersion medium so as to obtain a precursor dispersion; and
   second dispersing treatment of dispersing the solid electrolyte to the precursor dispersion so as to obtain the dispersion.

6. The method for producing the slurry according to claim 1, wherein the oxide active material contains a Li element, a Ti element, and an O element.

7. The method for producing the slurry according to claim 1, wherein the solid electrolyte is a sulfide solid electrolyte.

8. The method for producing the slurry according to claim 1, wherein the dispersion medium is at least one kind of a butyl butylate, a diisobutyl ketone, and a xylene.

9. The method for producing the slurry according to claim 1, wherein, when a viscosity measurement is conducted using a rheometer, a viscosity of the slurry at shearing speed of 1 S−1 is regarded as V1, and a viscosity of the slurry at shearing speed of 1000 S−1 is regarded as V1000, a rate V1/V1000, which is a rate of the V1 to the V1000 is 23 or less.

10. A method for producing an active material layer used in an all solid state battery, the method comprising:
   a slurry preparing step of preparing the slurry by the method for producing the slurry according to claim 1; and
   an active material layer forming step of forming the active material layer using the slurry.

11. A method for producing an all solid state battery including a cathode active material layer, an anode active material layer, and a solid electrolyte layer formed between the cathode active material layer and the anode active material layer, the method comprising:
   a slurry preparing step of preparing the slurry by the method for producing the slurry according to claim 1; and
   an active material layer forming step of forming the cathode active material layer or the anode active material layer, using the slurry.

12. The method for producing the slurry according to claim 1, wherein
   the dispersion medium is at least one of a butyl butyrate, a dibutyl ether, an ethyl acetate, a diisobutyl ketone (DIBK), a methyl ketone, a methyl propyl ketone, a xylene, a benzene, a toluene, a heptane, a dimethyl butane, a methyl hexane, a tributyl amine and an aryl amine.

13. The method for producing the slurry according to claim 1, wherein
   the transition element in the oxide active material contains a Ti element,
   the X element in the solid electrolyte contains a P element.

14. The method for producing the slurry according to claim 12, wherein
   the transition element in the oxide active material contains a Ti element,
   the X element in the solid electrolyte contains a P element.

* * * * *